United States Patent [19]

Harkins

[11] Patent Number: 5,389,753
[45] Date of Patent: Feb. 14, 1995

[54] FEED CONTROL SWITCH ASSEMBLY

[76] Inventor: John L. Harkins, 169 Battle Rd., SW., Calhoun, Ga. 30701

[21] Appl. No.: 101,418

[22] Filed: Aug. 3, 1993

[51] Int. Cl.⁶ .......................................... H01H 35/00
[52] U.S. Cl. .................. 200/85 R; 200/61.21
[58] Field of Search ................ 200/61.2, 61.21, 85 R, 200/61.41; 119/51.11, 57.2, 57.4, 51.12

[56] References Cited

U.S. PATENT DOCUMENTS

| | | | |
|---|---|---|---|
| 2,526,191 | 10/1950 | Barker | 200/61.21 |
| 3,598,087 | 8/1971 | Ramser | 119/51.11 |
| 3,611,995 | 10/1971 | Murto | 119/57.2 X |
| 3,646,512 | 2/1972 | Borgstede | 200/85 R X |
| 3,901,193 | 8/1975 | Gehlbach | 119/57.4 |
| 3,908,601 | 9/1975 | Geary | 119/57.4 |
| 3,933,041 | 1/1976 | Hyer | 200/61.21 X |
| 3,975,605 | 8/1976 | van Eeden et al. | 200/61.21 |
| 4,172,535 | 10/1979 | Smith | 200/61.21 X |
| 4,495,388 | 1/1985 | Yoder | 200/61.21 |
| 4,722,301 | 2/1988 | Strong | 119/57.4 |

*Primary Examiner*—J. R. Scott
*Attorney, Agent, or Firm*—Eric R. Katz

[57] ABSTRACT

A feed control switch is provided for controlling the supply of feed to a hopper without the need to contact the feed. The control switch includes first member having a switch contact surface and a second member slidably moveable relative to the first member, the second member having a suspender from which the hopper is suspended. A spring biasing arrangement pulls the first and second members together at a predetermined spring bias strength and switch, adjacent to the switch contact surface and at the second member, is provided which is in the off position when the switch is at an extended position and is in the on position when depressed by the contact surface. When the weight of feed in the hopper exceeds the predetermined spring bias strength, the second member pulls away from the first member causing the switch to move away from and disengage the switch contact surface so that the switch moves to the extended and off position thereby signally the cut off of feed to the hopper. When the predetermined spring bias strength exceeds the weight of feed in the hopper, the second member is pulled toward the first member causing the switch to engage the contact surface so that the switch moves to the depressed and on position thereby signalling for the supply of feed to the hopper.

15 Claims, 3 Drawing Sheets

FEED CONTROL SWITCH ASSEMBLY

BACKGROUND OF THE INVENTION

1. Field of the Invention

The present invention generally relates to a feed control switch for controlling the supply of livestock feed to a feed hopper, and more particularly, to a feed control switch which operates reliably and dependably without the need to contact the feed.

2. Background

For a chicken to efficiently gain weight in comparison to feed consumed, it is essential that the chicken always have adequate feed to eat when it is hungry. In order to provide feed on such an "as needed" basis, a plurality of feeding stations or feed pans, each typically suspended from the ceiling, are arranged in long rows along the length of the chicken coop and provided with feed when empty.

The feed pans are each connected to a conduit which, using an auger arrangement, delivers feed to the pans when an empty condition is sensed at the feed pans. The conduit is supplied from an intermediate hopper positioned at one end of the chicken coop. When the level of feed in the intermediate hopper drops to a predetermined level, it is then resupplied with feed from a main feed hopper positioned outside of the chicken coop.

Contact switches are generally used both sense the level of feed in the feed pans and to signal for the supply of feed to the feed pans from the intermediate hopper as needed. Additionally, a contact switching arrangement is provided to sense when feed to the intermediate hopper is needed from the main hopper.

Referring to FIG. 1, a known contact switch arrangement or flap switch for use in the intermediate hopper is generally illustrated at 11 and comprises a hinged flap 13 which pivots back and forth along the directions of arrow A so as to make a depressible contact switch 15 turn on and off. In this arrangement, the contact switch 15 is off when depressed and is on when released as shown in FIG. 1 so as to signal for the supply of feed B.

Typically, the switch arrangement 11 is positioned in the hopper at a height equaling the desired level of the feed when the hopper is full. Positioned adjacent the hinge flap 13 is a feed supply conduit 17 which pours feed B at the hinge flap 13. When the supply of feed to the hopper reaches the desired level in the hopper, the feed piles up in front of the flap 13 so that the weight of the pile 19 pivots the hinge flap 13 back against the contact switch 15 thereby pushing the switch 15 to the off position and cutting off the supply of feed. As the level of feed falls, the weight of the pile 19 of feed at the hinge flap 13 is reduced causing the flap 13 is spring forward to release contact switch 15 to the on position, as shown in FIG. 1, so as to continue the supply of feed B.

While operationally quite efficient when used at the feed pans, the flap switch 11 tends to hang-up when used in the intermediate hopper. Constant expose to feed causes grease to build up on the hinge flap 13 so the it has difficulty springing back to release the contact switch 15 to the on position. As result, when the flap switch 11 fails, the intermediate hopper is not supplied with feed from the main hopper and the plurality of feed pans become depleted of feed.

If the flap switch 11 hangs up in the middle of the night, the chickens can go unfed until morning. This causes a condition where the chickens are so hungry that when they are finally fed, they eat so quickly that the feed travels right through the bird without being fully digested resulting in an unacceptable conversion of feed to body weight.

A further deficiency of the known flap switch arrangement is that it has a tendency to switch on and off or "bounce" at the cut off rather than letting the motor run uninterrupted until the level of feed in the hopper reaches the desired level.

SUMMARY OF THE INVENTION

Accordingly, it is an object of the present invention to provide a feed control switch which operates reliably and dependably using the weight of feed contained by a hopper.

It is a further object of the present invention to provide a feed control switch is operated without the need to come into direct contact with feed in a hopper.

It is a yet another object of the present invention to provide a feed control switch which saves excessive wear on the feed supply motor by letting the motor run for a longer period of time instead of kicking on and off every few seconds as is experienced with the flap switch.

One particularly advantageous feature of the present invention is that the feed control switch is utilized to suspend a feed hopper above the chicken coop floor.

Yet another advantageous feature of the present invention is that the feed control switch can be easily adjusted so that a desired quantity (weight) of feed is consistently provided to the hopper.

These and other objects, advantages and features of the present invention are achieved, according to one embodiment thereof, by a feed control switch for controlling the supply of feed to a hopper, the feed control switch comprising a first member having a hanger from which the feed control switch is suspended and a second member slidably moveable relative to the first member, the second member having a suspender from which the hopper is suspended. A spring biasing arrangement is provided for pulling the first and second members together at a predetermined spring bias strength and a switch contact surface or flange is formed or provided at the first member. According to one advantageous embodiment of the present invention, the spring biasing arrangement comprises a helical coil compression spring which, according to the best mode of the invention, is a stiff double helical coil compression spring having ground ends, i.e., a tightly wound inner helical compression spring positioned inside a large outer helical compression spring. An on/off switch is positioned adjacent to the switch contact surface and at the second member so as to move with the second member, the switch being in an off position when the switch is at an extended position and being in an on position when the switch is at a depressed position.

The feed control switch operates as follows. When the weight of feed in the hopper exceeds the predetermined spring bias strength of the spring biasing arrangement, the second member, which carries the switch, pulls away from the first member causing the switch to move away from and disengage the switch contact surface at the first member. As a result, the switch moves to the extended and off position thereby signalling to cut off the supply of feed to be conveyed to the hopper. However, as feed is removed from the hopper to feed the chickens, at some point the predetermined spring bias strength overcomes the weight of the feed in the hopper and the second member is pulled toward the first member causing the switch to engage the contact surface so that the switch moves to the depressed and on position thereby signalling for the supply of feed to the hopper.

DETAILED DESCRIPTION OF THE PREFERRED EMBODIMENT(S)

Figure 1:
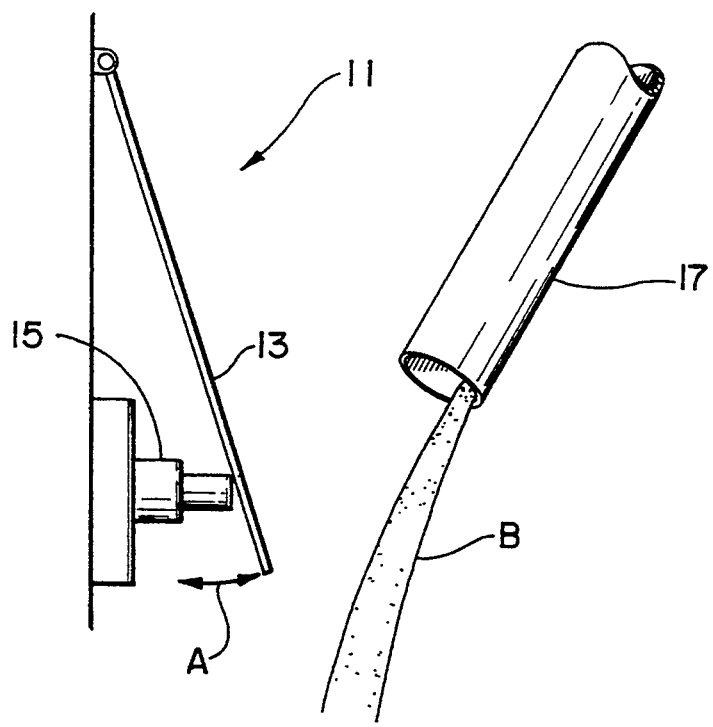
FIGS. 1 and 2 illustrate the on and off positions respectively of a known contact switching arrangement using a hinge flap and contact switch to control the supply of feed to an intermediate feed hopper.
Figure 2:
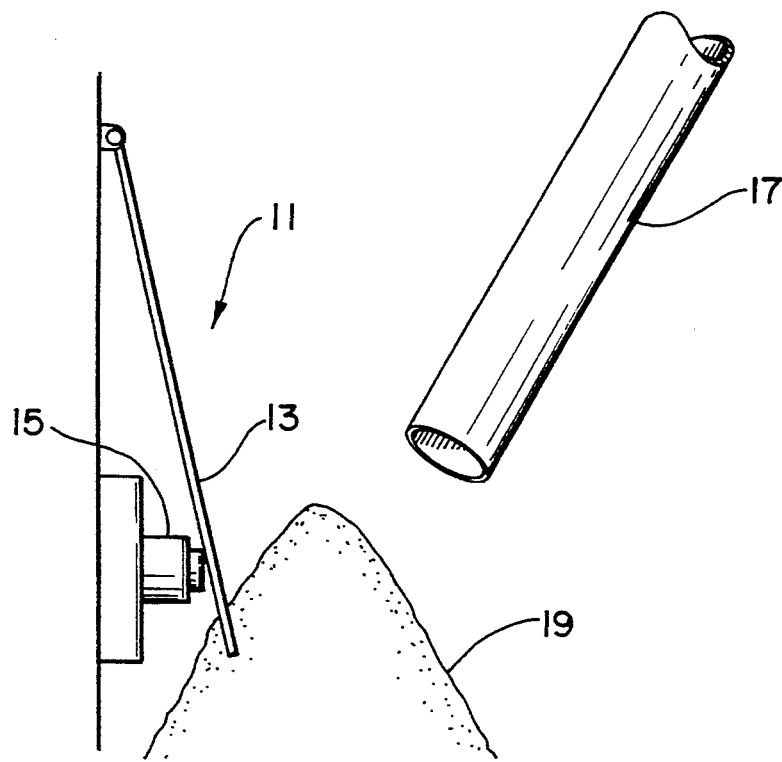
Figure 3:
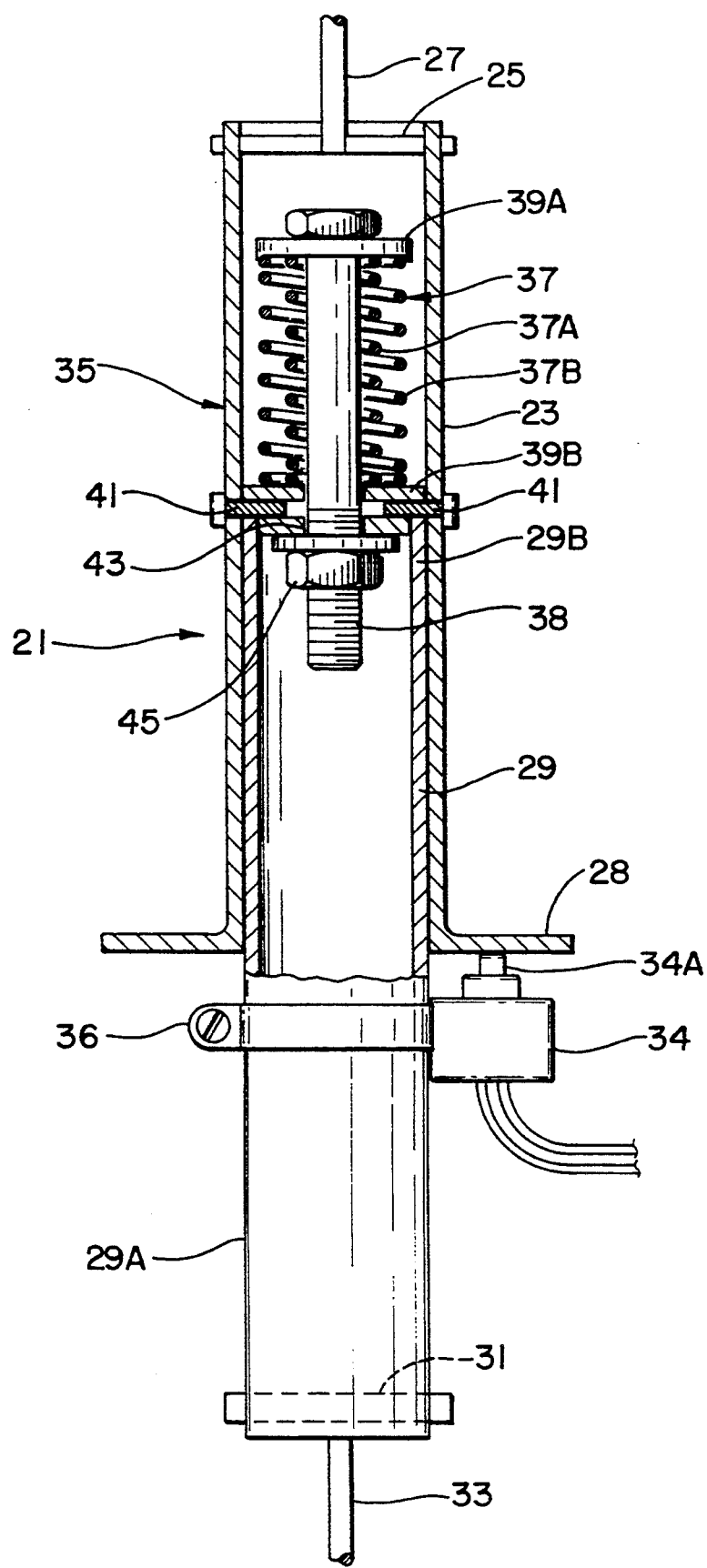
FIG. 3 is a side view, partially in section, illustrating one embodiment of the feed control switch of the present invention.

Referring to FIG. 3, one embodiment of the feed control switch of the present invention is illustrated, partially in section, generally at 21. According to the embodiment of FIG. 3, the feed control switch 21 includes a first tubular member 23 having a hanger 25 from which the feed control switch 21 is suspended, for example, by a rope or cord 27 from the ceiling (not shown) of a chicken coop. The first tubular member 23 is also provided with a switch contact surface or flange 28, the function of which will be more apparent as the following detailed description proceeds.

A second tubular member 29 is slidably received by and moveable relative to the first tubular member 23, the second tubular member 29 having a suspender 31 from which a feed hopper (not shown) is suspended, for example, by a rope or cord 33. The second tubular member 29 has an enclosed end 29B, having a hole 43, inserted into the first tubular member 23 in a telescoping manner and an exposed portion 29A which extends beyond the first tubular member 23. The exposed portion 29A carries a contact switch 34, preferably a microswitch, positioned adjacent to the switch contact surface 28.

The contact switch 34 is affixed to the exposed portion 29A by, for example, a ring clamp 36 or equivalent clamping arrangement so that the position of the contact switch 34 along the length of the exposed portion 29A can be easily adjusted and set. This feature is important because it permits an operator to selectively set the quiescent point of operation of the feed control switch 21 so that a desired weight of feed will consistently be provided to the hopper under the control of the feed control switch 21 when needed.

The contact switch 34 is configured so that the switch 34 is in the off position when the switch button 34A is released to an extended position and is in the on position when the switch button 34A is at a depressed position, as shown in FIG. 3., the distance of travel of the switch button 34A between its on and off positions being some set distance. A pair of electrical leads connect the contact switch 34 to a feed supply motor (not shown) which supplies feed to the hopper when it is turned on by the feed control switch 21.

A spring biasing arrangement, generally indicated at 35, is provided for holding or pulling the first and second tubular members 23, 29 together at a predetermined spring bias strength. The predetermined spring bias strength is set so that the weight of the hopper when loaded with the desired amount of feed will overcome the spring bias strength of the arrangement 35 and cause the first and second tubular members 23, 29 to pull apart so that switch button 34A is released to its off position. At weights substantially equaling an empty condition of the hopper, however, the spring bias strength is sufficiently strong to pull the first and second tubular members together so that the switch button 34A engages the switch contact surface 28 thereby causing the switch button 34A to be depress to the on position.

The spring biasing arrangement comprises a helical coil compression spring assembly 37 which, according to the best mode of the invention, is a stiff double helical coil compression spring having ground ends, i.e., a tightly wound inner helical compression spring 37A positioned inside a larger outer helical compression spring 37B.

The spring assembly 37 preferably has sufficient stiffness such that the spring assembly 37 will only compress a distance substantially equal to the distance of travel of the switch button 34A between its on and off positions when the strength of pull exerted on the feed control switch 21 is substantially equal to the weight of the hopper when filled with the desired amount of feed. However, the spring stiffness is such that when the hopper is almost empty of feed, the spring will expand from the above-noted compressed state by a distance equaling about the distance of travel of the switch button 34A between its on and off positions. As a result of this expansion, the first and second tubular members 23, 29 are pulled together so that the switch button 34A contacts the switch contact surface 28 and the switch button 34A is depressed to the on position.

When a hopper weighing about 45 lbs is to be consistently supplied with a maximum of about 200 lbs of feed at the full condition, the inventor has found that the stiffness and spring strength provide by an exhaust valve spring of a 350 cubic inch automobile engine furnishes the best results.

The spring assembly 37 is positioned on a threaded bolt 38 between a pair of spring seats or washers 39A and 39B, the washer 39B resting on a spring seat support 41 which comprises, for example, a plurality of pins inserted through the wall of the first tubular member 23. The spring seat support 41 is positioned at the midsection of the first tubular member 23 which receives the enclosed end 29B of the second tubular member 29. The threaded bolt 38 extends through the hole 43 at the enclosed end 29B of the second tubular member 29 and a nut 45 is threaded on to the bolt 38 so that the pair of spring seats 39A and 39B are drawn toward one another to place the spring assembly 37 under sufficient compression to firmly hold the first and second tubular members 23, 29 together.

Figure 4:
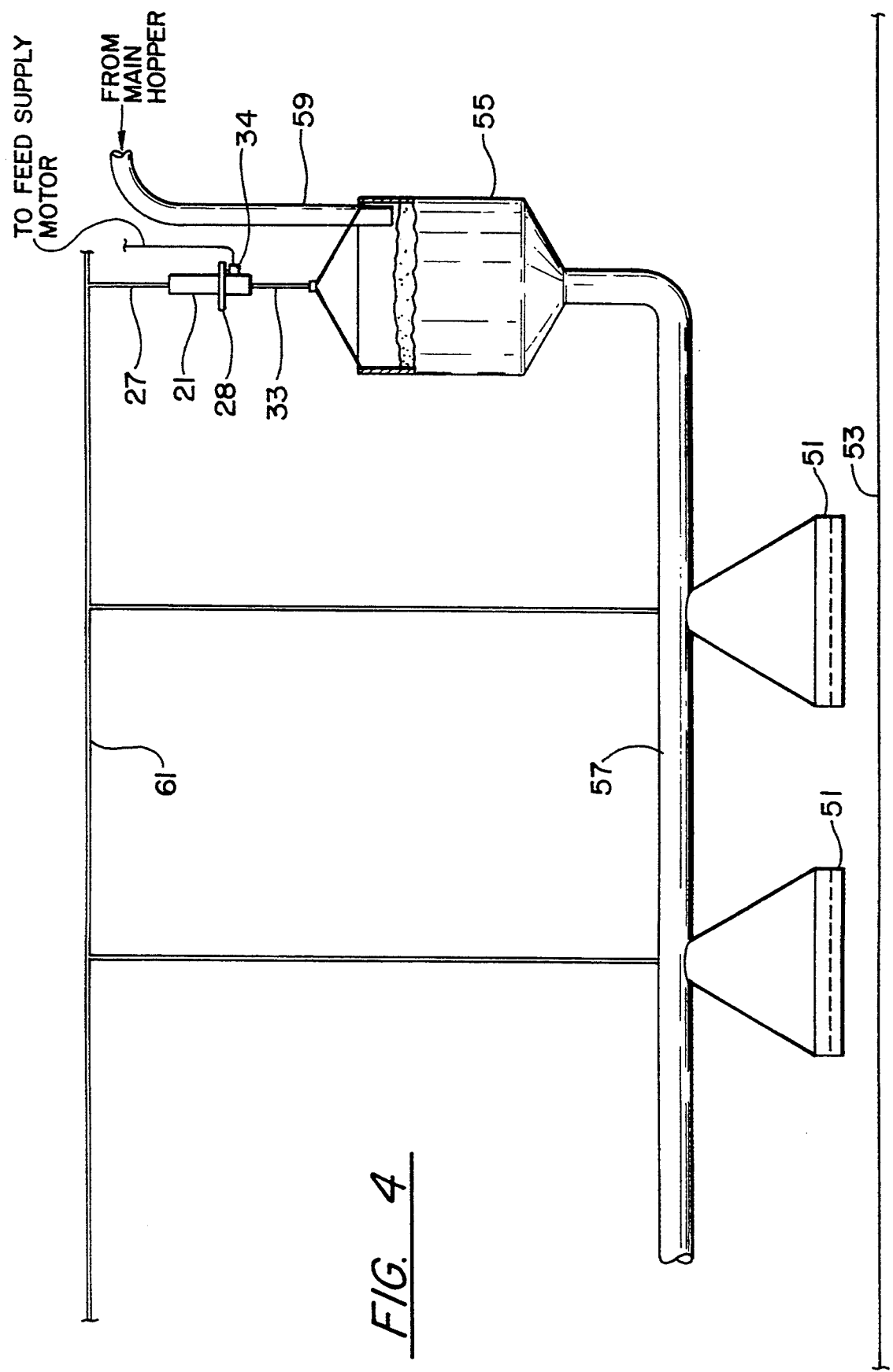
FIG. 4 is a schematic view illustrating the relation of the feed control switch to the various elements used to supply feed to chickens of a chicken coop.

The operation of the feed control switch 21 of the present invention will now be described with particular reference to FIG. 4 which schematically illustrates the feed distribution arrangement of a chicken coop. As previously described, a plurality of feeding stations or feed pans 51, suspended above the floor 53 of the chicken coop, are supplied with feed from an intermediate hopper 55 via a feed conduit 57. Feed is provided to the intermediate hopper 55 by way of a second feed conduit 59 which supplies feed from a main hopper (not shown) when a feed supply motor (not shown) is activated to supply feed through the second feed conduit 59.

According to the present invention, the intermediate hopper 55 is suspended from the ceiling 61 of the chicken coop using the feed control switch 21, i.e., the switch 21 is attached to both the intermediate hopper 55 and the ceiling by ropes, cords or the like. The feed control switch 21 is further electrically connected to control the operation of the feed supply motor which drives the feed to the intermediate hopper 55 from the main feed hopper.

In operation, when the weight of feed in the intermediate hopper 55 exceeds the predetermined spring bias strength of the spring assembly 37, the weight of the feed pulls the second tubular member 29 away from the first tubular member 23 causing the switch 34, carried by the second tubular member 29, to move away from and disengage the switch contact surface 28 so that the switch button 34A moves to the extended position thereby turning switch 34 off and signalling the cut off of the supply of feed to be conveyed to the intermediate hopper 55.

Then, as feed is supplied to feed the chickens, the weight of the feed in the intermediate hopper 55 deceases. When the predetermined spring assembly bias strength of the spring 37 exceeds the weight of feed in the hopper 55, the second tubular member 29 is pulled by the spring assemble 37 toward the first member causing the switch 34 to move into engagement with the contact surface 28 so that the switch button 34A is depressed thereby turning on the switch 34 and signalling for the supply of feed to the hopper 55.

In order to set the feed supply switch 21 of the present invention so that a selected amount of feed is consistently supplied to the hopper 55, the clamp 36, holding the switch 34 to the second tubular member 29, is released and moved into with the contact surface 28 so that a supply of feed is provided to the hopper 55. When a desired quantity (weight) of feed is furnished to the hopper 55, the switch 34 is slid out of contact with the contact surface 28 and clamped into position so that the switch 34 is turned off. In this fashion, the quiescent point of operation of the feed control switch 21 is set so that the desired amount or weight of feed supplied to the hopper 55 is always delivered to the hopper 55.

Although the present invention has been described with particular reference to its preferred embodiments, it should be understood that many variations and modifications will now be obvious to those skilled in that art, and it is preferred, therefore, that the scope of the invention be limited, not by the specific disclosure herein, but only by the appended claims.

What is claimed is:

1. A feed control switch assembly for turning on and off the supply of feed to be conveyed to a hopper, the feed control switch assembly comprising:
    a first member having:
        a) a hanger at a one end thereof from which the feed control switch is suspended, and
        b) an open end opposite the one end;
    a second member, received by the open end of the first member, the second member being slidably moveable relative to the first member and having a suspender from which a cord is suspended for attachment to the hopper;
    a spring biasing means for pulling the first and second members together at a predetermined spring bias strength;
    a flange at the open end of the first member, the flange extending outwardly of the first member and forming a stop; and
    an electrical switch having a switch button which turns off the electrical switch when the switch button is released to an extended position and turns on the electrical switch when the switch button is at a depressed position, the electrical switch being positioned adjacent to the flange and on the second member;
    wherein, when the weight of feed in the hopper exceeds the predetermined spring bias strength, the second member pulls away from the first member causing the electrical switch to move away from and disengage the flange so that the switch button is released to the extended position thereby turning off the electrical switch and the supply of feed to the hopper; and
    wherein, when the predetermined spring bias strength exceeds the weight of feed in the hopper, the second member is pulled toward the first member causing the electrical switch to contact the flange so that the switch button is compressed to the depressed position thereby turning on the electrical switch and the supply of feed to be conveyed to the hopper.

2. A feed control switch assembly according to claim 1, wherein the first and second members are tubular members which respectively are sized relative to one another so that the second member is slidably received by the first member.

3. A feed control switch assembly according to claim 1, wherein the spring biasing means includes a helical coil compression spring.

4. A feed control switch assembly according to claim 3, wherein the helical coil compression spring comprises double helical coil compression spring having a tightly wound inner helical compression spring positioned inside a larger outer helical compression spring.

5. A feed control switch assembly according to claim 1, wherein the electrical switch is attached to the second member by a clamping means for adjusting the position of the switch relative to the flange.

6. A feed control switch assembly for controlling the supply of feed to be conveyed to a hopper which is suspended by the feed control switch assembly, the feed control switch assembly comprising:
    a first tubular member having a hanger from which the feed control switch assembly is suspended;
    a second tubular member slidably received by and moveable relative to the first member, the second member having a suspender from which a cord is suspended for attachment to the hopper and an exposed portion which extends beyond the first tubular member;
    a spring biasing means for pulling the first and second members together at a predetermined spring bias strength;
    a flange which forms a stop at the first tubular member; and
    an electrical switch, carried by the second tubular member adjacent to the flange of the first tubular member, the electrical switch having a switch button which turns off the electrical switch when the switch button is released to an extended position and turns on the electrical switch when the switch button is compressed to a depressed position;

wherein, when the weight of feed in the hopper exceeds the predetermined spring bias strength, the second member pulls away from the first member causing the switch to move away from and disengage the flange so that the switch button is released to the extended position thereby turning off the electrical switch and the supply of feed to be conveyed to the hopper; and wherein, when the predetermined spring bias strength exceeds the weight of feed in the hopper, the second member is pulled toward the first member causing the electrical switch to contact the flange so that the switch button is compressed to the depressed position thereby turning on the electrical switch and the supply of feed to be conveyed to the hopper.

7. A feed control switch assembly according to claim 6, wherein the first and second tubular members are made of galvanized pipe.

8. A feed control switch assembly according to claim 6, wherein the spring biasing arrangement includes a helical coil compression spring.

9. A feed control switch assembly according to claim 8, wherein the helical coil compression spring comprises double helical coil compression spring having a tightly wound inner helical compression spring positioned inside a larger outer helical compression spring.

10. A feed control switch assembly according to claim 6, wherein the switch is clamped to the second member by a clamping means for adjusting the position of the switch relative to the flange.

11. A feed control switch assembly for controlling the supply of feed to be conveyed to a hopper which is suspended from the feed control switch assembly, the feed control switch assembly comprising:

a) a first tubular member, having first and second ends, comprising:
  1) a hanger, at the first end, from which the feed control switch assembly is suspended;
  2) a flange, at the second end, which extends radially outward from the first tubular member and forms a stop; and
  3) a spring seat support inside the first tubular member adjacent to the second end for supporting a spring seat;

b) a second tubular member slidably received at the second end of the first tubular member and moveable relative to the first member, the second member comprising:
  1) an enclosed end for insertion into the first tubular member, the enclosed end having a hole therethrough; and
  2) an exposed portion which extends beyond the first tubular member, the exposed portion having a suspender from which the hopper is suspended;

c) a spring biasing means for pulling the first and second members together at a predetermined spring bias strength, the spring biasing means comprising:
  1) a helical coil compression spring having first and second ends;
  2) a first spring seat positioned at the first end of the spring;
  3) a second spring seat positioned at the spring seat support of the first tubular member, wherein the second end of the spring rests on the second spring seat;
  4) a threaded bolt extending through the first and second spring seats and the helical coil compression spring along a longitudinal axis of the spring, the bolt having an enlarge head at one end which is held by the first spring seat and a threaded shaft which extends beyond the second spring seat and through the hole in the enclosed end of the second tubular member; and
  5) a nut threaded onto the threaded shaft of the bolt, wherein when the nut is tightened, the first spring seat in pulled toward the second spring seat thereby placing the helical coil compression spring under compression;

d) an electrical switch carried by the second tubular member adjacent to the flange, the electrical switch having a switch button which turns off the electrical switch when the switch button is released to an extended position and turns on the electrical switch when the switch button is depressed to a depressed position; and e) clamping means for adjusting the position of the switch relative to the flange;

wherein, when the weight of feed in the hopper exceeds the predetermined spring bias strength, the second member pulls away from the first member causing the electrical switch to move away from and disengage the flange so that the switch button is released to the extended position thereby turning off the electrical switch and the supply of feed to be conveyed to the hopper; and wherein, when the predetermined spring bias strength exceeds the weight of feed in the hopper, the second member is pulled toward the first member causing the switch to engage the contact surface so that the electrical switch is compressed to the depressed position thereby turning on the electrical switch and the supply of feed to be conveyed to the hopper.

12. A feed control switch assembly according to claim 11, wherein the first and second tubular members are made of galvanized pipe.

13. A feed control switch assembly according to claim 11, wherein the helical coil compression spring is a double helical coil compression spring having first and second ground ends.

14. A feed control switch assembly according to claim 11, wherein the clamping means for adjust the position of the switch relative to the switch contact surface is a ring clamp.

15. A feed control switch assembly according to claim 11, wherein the first and second spring seats are each a washer.

* * * * *